US006621763B2

(12) United States Patent
Lyon

(10) Patent No.: US 6,621,763 B2
(45) Date of Patent: Sep. 16, 2003

(54) POWER SAVING TECHNIQUE FOR PULSE-ECHO ACOUSTIC RANGING SYSTEMS

(75) Inventor: George Quinton Lyon, Peterborough (CA)

(73) Assignee: Siemens Milltronics Process Instruments Inc., Ontario (CA)

( * ) Notice: Subject to any disclaimer, the term of this patent is extended or adjusted under 35 U.S.C. 154(b) by 0 days.

(21) Appl. No.: 09/909,868

(22) Filed: Jul. 23, 2001

(65) Prior Publication Data

US 2003/0021186 A1 Jan. 30, 2003

(51) Int. Cl.$^7$ ............................................. G01S 15/08
(52) U.S. Cl. ..................... 367/99; 367/908; 73/290 V
(58) Field of Search ................. 367/99, 908; 73/290 V; 341/144, 152

(56) References Cited

U.S. PATENT DOCUMENTS

| | | | | |
|---|---|---|---|---|
| 4,992,998 A | * | 2/1991 | Woodward | 367/99 |
| 5,793,704 A | * | 8/1998 | Freger | 367/908 |
| 6,122,602 A | * | 9/2000 | Michalski et al. | 367/99 |
| 6,169,706 B1 | * | 1/2001 | Woodward et al. | 367/99 |
| 2002/0016691 A1 | * | 2/2002 | Kameda et al. | 702/69 |

* cited by examiner

Primary Examiner—Ian J. Lobo
(74) Attorney, Agent, or Firm—Birch, Stewart, Kolasch & Birch, LLP

(57) ABSTRACT

A power saving system and method for the analog-to-digital converter stage in a time of flight ranging system. A receiving echo signal having an envelope is converted into a digital form suitable for further processing by sampling the received echo signal envelope at precise intervals to obtain amplitude measurement points. An interpolation function is applied between each pair of adjacent amplitude measurement points. The application of the interpolation function provides a closer approximation of the shape of the received echo signal envelope without the need to use higher sampling rates which means slower analog-to-digital converters may be utilized resulting in power and cost savings.

12 Claims, 4 Drawing Sheets

POWER SAVING TECHNIQUE FOR PULSE-ECHO ACOUSTIC RANGING SYSTEMS

FIELD OF THE INVENTION

The present invention relates to level measurement systems, and more particularly to a power saving method and system for the analog-to-digital converter stage in pulse-echo acoustic ranging and time of flight ranging systems.

BACKGROUND OF THE INVENTION

Pulse-echo acoustic ranging systems, also known as time of flight ranging systems, are commonly used in level measurement applications. Pulse-echo acoustic ranging systems determine the distance to a reflector (i.e. reflective surface) by measuring how long after transmission of a burst of energy pulses the echo is received. Such systems typically use ultrasonic pulses or pulse radar signals. In applications for time of flight pulse-echo acoustic ranging systems, there are power supply limitations necessitating that these instruments operate from very small amounts of current.

The current loop configuration is one well-known approach to the power limitations imposed on pulse-echo ranging systems or time of flight distance ranging systems. For the current loop configuration, the instrument must consume between 4 mA and 20 mA both to power itself and to indicate the distance measured.

As a result of the constraints of the current loop configuration, various schemes have been devised to reduce the power consumed by these instruments. One scheme involves putting the microprocessor into a 'sleep' or 'idle' state between measurements. Another scheme involves only running various parts of the system when required and then switching them off when not required.

A further requirement for more sophisticated time of flight ranging systems and pulse-echo acoustic ranging systems is the need to process the entire received echo waveform in order to extract the correct echo. It is necessary to process the entire received waveform to separate the echo from the clutter of other signals which may appear in the waveform. In such systems, the received echo waveform is digitized using an analog-to-digital (A/D) converter and the converted waveform is stored for subsequent processing.

The resolution of the distance measurement is related to the rate at which the received echo waveform is sampled by the A/D converter. The received echo waveform is also known as the echo profile in time of flight ranging. If the received echo waveform or profile is sampled more rapidly, then there will be more points per unit length than there would be if a slower sample rate were utilized. It will be appreciated that the accuracy of the distance determination or level measurement is improved by a higher sampling rate of the received echo waveform or profile. Unfortunately, faster sample rates mean higher power consumption.

To alleviate the concomitant power consumption penalty associated with the higher sampling rates, a number of approaches have been attempted. If the sample rate is reduced, then the A/D converter will consume less power. One approach involves turning off the A/D converter, or switching to a lower power mode, when an echo profile is not being sampled. Another approach involves utilizing a slower A/D converter which consumes less power than the faster sampling A/D converters. Other power saving approaches involve saving power in the operation of the central processing unit (CPU) which controls the operation of the A/D converter and the pulse-echo acoustic ranging system. The CPU is turned off between conversions of the received echo waveforms or the CPU is run more slowly. A slower low power CPU may also be utilized to control the pulse-echo acoustic ranging system. For implementations where a single chip microcontroller unit (MCU) is utilized with a built-in, on-chip, A/D converter, the design choice is to select a low power MCU.

While the known approaches can decrease power consumption in time of flight ranging devices and pulse-echo acoustic ranging systems, there is still room for improvement. Accordingly, there remains a need for improvement in power consumption in time of flight ranging devices and pulse-echo acoustic ranging systems.

BRIEF SUMMARY OF THE INVENTION

The present invention provides a mechanism for reducing power consumption in an analog-to-digital converter without incurring the usual penalty related to loss of resolution.

In a first aspect, the present invention provides a method for converting a received echo signal into a digital form suitable for further processing in a time of flight ranging system, the method includes the steps of: (a) inputting the received echo signal, said received echo signal having a signal envelope; (b) sampling the signal envelope of the received echo signal at precise intervals to obtain amplitude measurement points for the received echo signal; and (c) applying an interpolation function between each pair of adjacent amplitude measurement points, the interpolation function provides a closer approximation of the shape of the received echo signal envelope.

In another aspect, the present invention provides a time of flight ranging system having: (a) a transducer for emitting energy pulses and coupling reflected energy pulses; (b) a controller having a receiver component and a transmitter component, and the controller including an analog-to-digital converter and a precise time-base generator; (c) the transducer having an input port operatively coupled to the transmitter component which is responsive to the transmitter component for emitting the energy pulses, and the transducer includes an output port operatively coupled to the receiver component for outputting reflected energy pulses coupled by the transducer; (d) the receiver component converts the reflected energy pulses into corresponding electrical signals, and the receiver component includes an output port coupled to an input port on the analog-to-digital converter which receives the electrical signals, the analog-to-digital converter is responsive to control signals from the controller for obtaining amplitude measurement points at predetermined intervals derived from the precise timebase generator; (e) the controller includes a program component for applying an interpolation function between adjacent amplitude measurement points, and the interpolation function provides an approximation of the reflected energy pulse shape between the adjacent amplitude measurement points.

In a further aspect, the present invention provides a pulse-echo acoustic ranging system comprising: (a) a transducer for emitting acoustic pulses and detecting reflected acoustic pulses; (b) a controller having a receiver component and a transmitter component, and the controller including an analog-to-digital converter and a precise timebase generator; (c) the transducer has an input port operatively coupled to the transmitter component and is responsive to the transmitter component for emitting the acoustic pulses, and the transducer includes an output port operatively coupled to the receiver component for outputting reflected acoustic pulses coupled by the transducer; (d) the receiver component converts the reflected acoustic pulses into corresponding electrical signals, and the receiver component has an output port coupled to an input port on the analog-to-digital converter for receiving the electrical signals, the analog-to-digital converter is responsive to control signals from the controller for obtaining a plurality of amplitude measurement points at predetermined intervals derived from the precise timebase generator; (e) the controller includes a program component for applying an interpolation function between adjacent amplitude measurement points, and the interpolation function provides an approximation of the reflected acoustic pulse shape between the adjacent amplitude measurement points.

BRIEF DESCRIPTION OF THE DRAWINGS

Reference will now be made to the accompanying drawings, which show, by way of example, a preferred embodiment of the present invention, and in which.

DETAILED DESCRIPTION OF THE PREFERRED EMBODIMENTS

Figure 1:
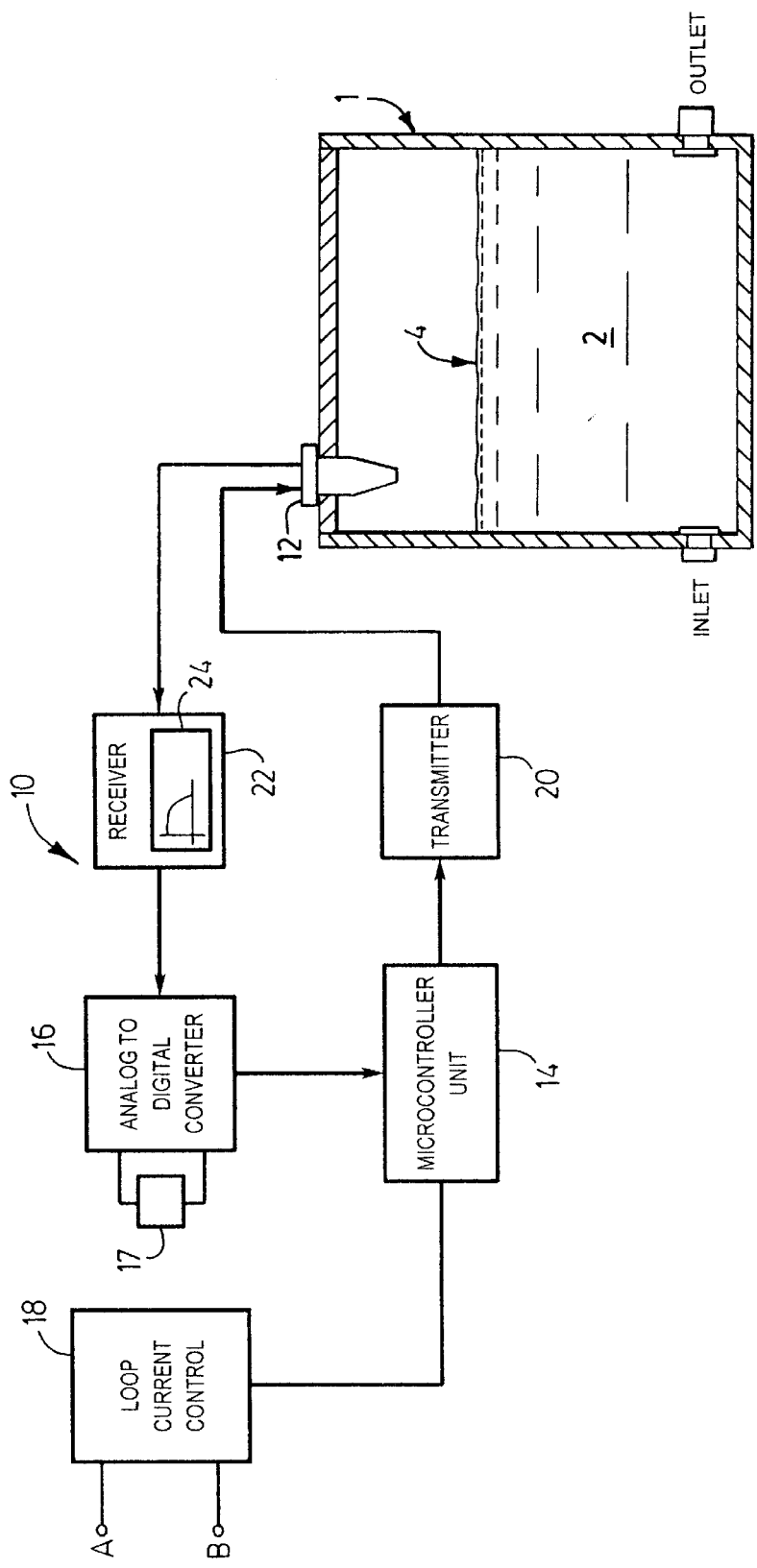
FIG. 1 shows in diagrammatic form a pulse-echo acoustic ranging device utilizing a digitization and interpolation technique according to the present invention.

Reference is first made to FIG. 1, which shows in diagrammatic form an ultrasonic pulse-echo acoustic ranging device 10 utilizing a power saving mechanism according to the present invention. While the power saving mechanism is described in the context of a pulse-echo acoustic ranging device or time of flight ranging system, it will be understood that the mechanism is applicable to transmitters measuring other process variables, and that the details of the pulse-echo ranging techniques utilized form no part of the invention in its broadest aspect.

As shown in FIG. 1, the pulse-echo acoustic ranging device 10 comprises an ultrasonic transducer 12, a microcontroller unit 14, an analog-to-digital converter 16, and current (4–20 mA) loop interface module 18. The transducer 12 is coupled to the microcontroller unit 14 through a transmitter 20. The microcontroller unit 14 uses the transmitter 20 to excite the transducer 12 to emit ultrasonic pulses. Reflected or echo pulses are coupled by the transducer 12 and converted into an electrical signal in a receiver 22.

Figure 2:
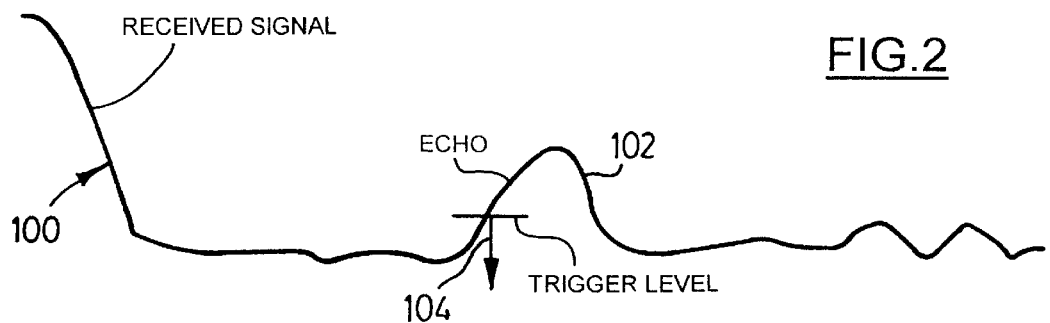
FIG. 2 shows in diagrammatic form a typical received echo waveform for a time of flight ranging device or a pulse-echo acoustic ranging system.

The ultrasonic pulse-echo ranging device 10, i.e. the ultrasonic transducer 12, is installed in a tank 1 containing a liquid 2 with a level determined by the top surface of the liquid 2. The top surface of the liquid 2 provides a reflective surface or reflector, indicated by reference 4, which reflects the ultrasonic pulses generated from the emitter on the transducer 12. The reflected ultrasonic pulse is coupled by the transducer 12 and converted by the receiver 22 into an electrical signal which takes the form of a receive echo waveform 100 as shown in FIG. 2. The receive echo waveform 100 is characterized by an echo pulse 102, i.e. the reflected ultrasonic pulse. The received echo pulse 102 is sampled and digitized by the A/D converter 16 for further processing by the microcontroller unit 14. The microcontroller unit 14 executes an algorithm which identifies and verifies the echo pulse 102 and calculates the range of the reflective surface 4, i.e. the time it takes for the reflected ultrasonic pulse, i.e. echo pulse 102, to travel from the reflective surface 4 to the receiver on the transducer 12. From this calculation, the distance to the surface of the liquid 4 and thereby the level of the liquid is determined. The microcontroller 14 also controls the transmission of data and control signals through the current loop interface 18. The microcontroller 14 is suitably programmed to perform these operations as will be within the understanding of those skilled in the art.

For the ultrasonic pulse-echo ranging device 10, the ultrasonic transducer 12 produces ultrasonic pulses which travel at a velocity of around 343 meters/second (i.e. the velocity of sound) at 20° C.

Reference is next made to FIG. 2, which shows in diagrammatic form the received echo waveform or profile echo 100 for the pulse-echo acoustic ranging device 10. The received echo waveform 100 comprises an echo pulse 102 as shown. The determination of the echo pulse 102 is characterized by a trigger level indicated by reference 104.

Figure 3:
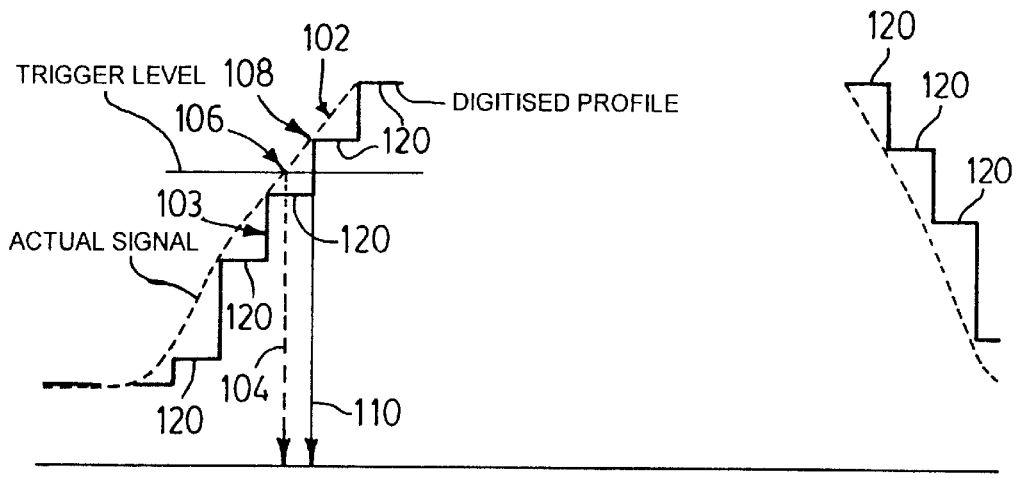
FIG. 3 shows in diagrammatic form the received echo waveform digitized according to the prior art.

The point in time at which the echo pulse 102 is detected is related to the distance to the reflector 4. As will be familiar to those skilled in the art, various schemes have been devised to identify that trigger point 104 on the echo pulse 102 which most accurately determines the distance to the reflector 4. For example, one technique is to use a fixed percentage of the height of the echo pulse 102 above a noise floor level, as indicated by reference 106. It will be appreciated that if the received echo waveform 100 is digitized with a low sample rate, the trigger point 104 will be subject to the same granularity as the sample rate resulting in a resolution penalty in the final output. For this reason, the conventional technique is to sample at a rate required to deliver the required resolution as depicted in FIG. 3. For example, to digitize the ultrasonic echo signal 102, a step size of 3 millimeters (mm) is chosen as indicated by reference 120. For the 3 mm step size, a sampling rate of 57,167 samples per second or a sample every 17.5 microseconds.

Figure 4:
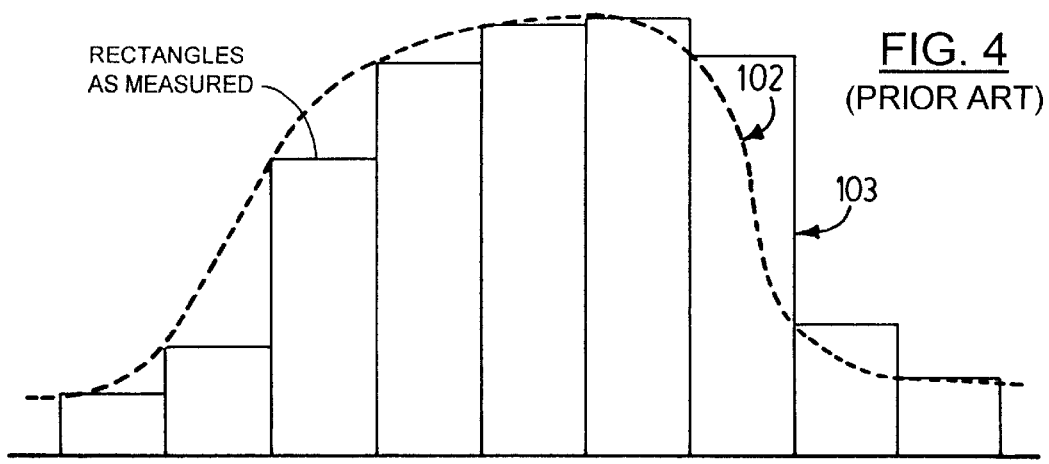
FIG. 4 shows in diagrammatic form the digitized echo pulse of FIG. 3 in more detail.

Using traditional techniques, sampling the echo pulse 102 at the sampling rate produces a digitized echo pulse indicated generally by reference 103 in FIGS. 3 and 4. The digitized echo pulse 103 is a staircase approximation of the original analog echo pulse 102 and not a discrete straight line approximation. As shown in FIG. 3, a trigger point 106 occurs where the echo pulse 102 cuts the trigger level 104. For the digitized echo pulse 103. For the digitized echo pulse 103, a trigger point 108 occurs where the digitized pulse 103 cuts the trigger level to the resolution of the sample rate. As shown in FIG. 3, the quantized sampling rate shifts the trigger point 108 to a new trigger level indicated by reference 110. If a slower sampling, i.e. digitization, rate is utilized, then the best resolution would be larger than 3 mm.

Figure 6:
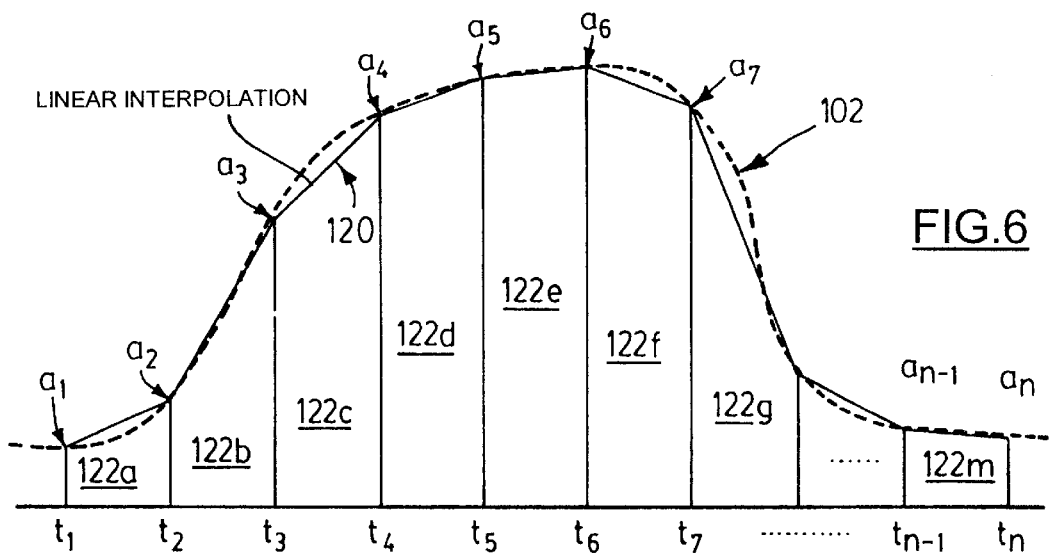
FIG. 6 shows in diagrammatic form a digitized echo pulse generated according to the digitization and interpolation method of FIG. 5.
Figure 5:
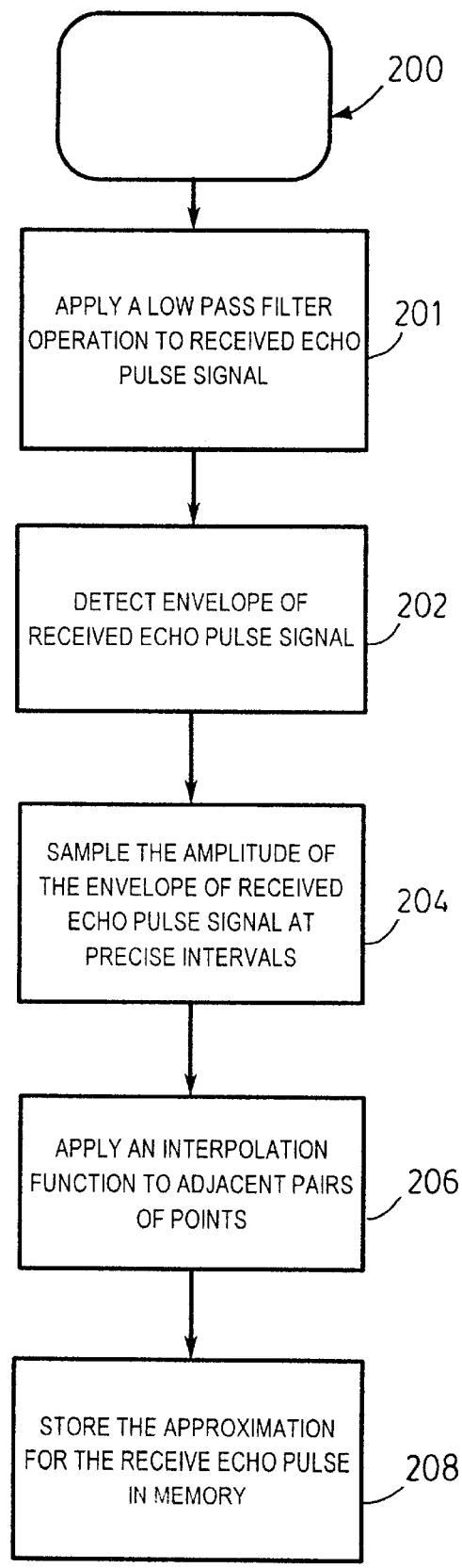
FIG. 5 shows in flow chart form a digitization and interpolation method according to the present invention.

Reference is next made to FIG. 5, which shows in flow chart form a digitization and interpolation method according to the present invention for accurately converting the received echo pulse 102 into a form suitable for further processing in the pulse-echo acoustic ranging device 10. As will be described, the digitization and interpolation method indicated generally by reference 200 is suitable for use with a low sampling rate A/D converter (e.g. the A/D converter 16 in the pulse-echo ranging device 10 shown in FIG. 1) without a loss in resolution. Advantageously, operating the A/D converter at a lower sampling rate reduces power consumption for the pulse-echo acoustic ranging device 10 (or time of flight ranging system). As shown in FIG. 6, an echo pulse signal 120 is generated which more closely approximates the original received echo signal 102.

As shown in FIG. 5, the first step (block 202) in the digitization and interpolation method 200 involves detecting the envelope of the received echo pulse signal (i.e. the received echo waveform 100 as described above) taking amplitude samples, indicted by $a_1$, $a_2$, $a_3$, ... an of the received echo pulse 102 at precise intervals indicated by $t_1$, $t_2$, $t_3$ ... $t_n$ (FIG. 6). Preferably, the time base used by the A/D converter 16 to generate the sample intervals, i.e. $t_1-t_2$, is referenced to a highly accurate timebase or timebase generator indicated by reference 17 in FIG. 1, for example, a stable crystal or ceramic resonator coupled directly. The function of the timebase generator 17 is to supply sample intervals with a high degree of accuracy. As a result, the sample times $t_1$, $t_2$ ... $t_n$ are thus known very accurately.

As shown in FIG. 5, the digitization and interpolation method 200 preferably includes a filtering step. The filtering step (block 201) comprises a low pass filter operation on the received echo signal 102 which is performed before the envelope detection operation (block 202) and the amplitude sampling step (block 204). The filtering step in block 201 eliminates unexpected deviations in the received echo pulse 102. The low pass filter is selected to match the bandwidth of the pulse-echo acoustic ranging device 10. For instance, if the bandwidth of the ultrasonic transducer is 10 KHz then there is no advantage to using a low pass filter with a larger bandwidth and in practice, a larger bandwidth filter will worsen the receive pulse signal 102 because noise from various sources appear in the signal. Similarly, the bandwidth of the filter must be sufficient so that the amplitude of the echo pulse 102 is not attenuated in a way that the signal integrity is compromised. As shown in FIG. 1, a low pass filter circuit 24 is included in the receiver 22 for the pulse-echo acoustic ranging device 10.

For the sampling step (block 204), the A/D converter 16 preferably has a sample and hold circuit (not shown). The sample and hold circuit 'freezes' the signal being measured and this allows the amplitude reading an of the echo pulse 102 to be measured to a high degree of accuracy at time $t_n$.

Figure 7:
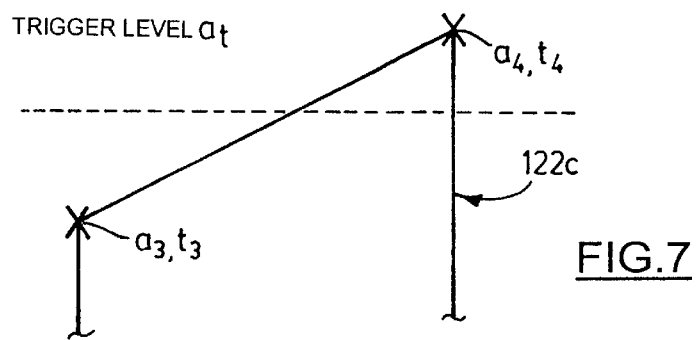
FIG. 7 shows a linear interpolation method for digitizing a received echo waveform according to the present invention.

Referring to FIG. 5, the next step comprises an interpolation operation (block 206). Because the co-ordinates, i.e. $a_n$, $t_n$, for the sampled echo pulse 120 are known exactly, if the echo pulse 102 is known to track from one point to the next in a known way, then the sampled echo pulse 120 can be used to determine the corresponding amplitude value for the echo pulse 102 at any point in between the sampling points can be calculated exactly, such as the trigger point (FIG. 7).

According to one aspect of the invention, the digitization and interpolation method 100 utilizes a linear interpolation technique in step 206 (FIG. 5). As shown in FIG. 6, the resulting sampled echo pulse signal 120 comprises a series of trapezoids 122 next to each other, shown individually as 122a, 122b, 122c, ... 122m. This trapezoidal approximation provides a very close approximation to the received echo pulse 102 without the need to utilize an A/D converter with a high sampling rate. As indicated in step 208, the approximation for the receive echo pulse is stored in memory.

A trapezoid 122 is formed by generating a straight line between two measured points, $((t_p, a_p), (t_{p+1}, a_{p+1}))$ using a linear interpolation operation as follows. Referring to FIG. 7, the trapezoidal approximation 122c is generated for the co-ordinates $t_3, a_3$ and $t_4, a_4$ which also straddles the trigger level. The trigger value at voltage at is now used to accurately calculate the distance (i.e. time) co-ordinate $t_t$ somewhere between the two accurately measured points according to equation (1) as follows:

$$t_t=(t_4-t_3)/(a_4-a_3)*(a_t-a_3)+t_3 \qquad (1)$$

It will be appreciated that the step size $t_4-t_3$ need not be calculated every time if the time step size is known. If the step size is given by s then equation (1) reduces to equation (2) as follows:

$$t_t=s/(a_4-a_3)*(a_t-a_3)+t_3 \qquad (2)$$

It will further be appreciated that there are other ways of calculating the values for the trapezoidal approximations 122. For example, the co-ordinates may be rearranged and renamed. Alternatively, more than two co-ordinates may be utilized with a best fit type of approximation where the error is minimized (regression). This applies to the use of higher order functions such as a parabola or one of the many spline functions, even artificial intelligence determinations such as fuzzy logic will yield the desired result of better accuracy with slower sample rates.

Another method of interpolating between the coarsely measured points is to use more than just the two co-ordinates on either side of the co-ordinate in question.

It may also be advantageous to use more than one point on either side so as to reduce the effect of noise and uncertainty that may have been introduced to the signal.

A technique for minimizing errors and interpolating at the same time is the method of least squares. The least squares method calculates the best approximating line when the error involved is the sum of the squares of the differences between the y co-ordinate (in this case signal amplitude) on the approximating line and the measured y values. The approximating of measured data set $\{(x_i, y_i)|i=1,2, \ldots, m\}$ with a polynomial $$P_n(x) = \sum_{k=0}^{n} a_k x^k$$

of degree n<m−1 using the least squares method requires choosing the constants $a_0, a_1, \ldots, a_n$ to minimize the "least squares" error E as given by:

$$E = \sum_{i=1}^{m} (y_i - P_n(x_i))^2$$

This is done by solving the set of normal equations in n+1 unknowns for each j=0,1 ... ,n where $$\frac{\partial E}{\partial a_j} = 0.$$

An implementation for this involves a linear curve (degree 1) using a few points around the area of interest. For the most effective use of the least squares minimization it is preferable to use a polynomial of higher degree so that the coarseness of sampling can be increased and still maintain a close approximation to the original curve.

Because the error has been determined it is possible to test the goodness of the fit that has been calculated to decide whether the approximation is accurate enough and to take appropriate action if it is not. If the approximation is excessively accurate it may be preferable to reduce the size of the data set and conserve power even more.

Having determined the best function for the measured data, the next step involves calculating the unknown x value for the known y value (the echo threshold). This process is also called 'inverse interpolation' because the value of x is calculated for a known y.

Another method of interpolating between the coarsely measured points involves using more than just the two co-ordinates on either side of the co-ordinate in question. It may be advantageous to use more than one point on either side and so to fit a higher order polynomial rather than the straight line as described above. Such a polynomial is useful over the small interval required for calculation of the instant when the echo threshold was exceeded. To use a polynomial of degree n, n+1 points are needed For a degree 2 polynomial, also known as a quadratic, 3 points are required and preferably bounding the point to be interpolated. Although a much higher order polynomial can be calculated to fit a larger number of points this would not necessarily be of benefit because the curve may deviate excessively from the intended trajectory.

To calculate the coefficients to a Lagrangian interpolating polynomial of degree 2 the three known co-ordinates $\{(x_i, y_i)|i=1,2,3,\}$ are used to write the following equations:

$$y_1 = a_0 + a_1 x_1 + a_2 x_1^2$$
$$y_2 = a_0 + a_1 x_2 + a_2 x_2^2$$
$$y_3 = a_0 + a_1 x_3 + a_2 x_3^2$$

Solving the 3 equations for 3 the unknowns $a_0, a_1, a_2$ generates an equation $y=a_0+a_1 x+a_2 x^2$ that can be solved for any value of y, valid within the bounds of the co-ordinates used. This last step is the inverse interpolation, and because the points are not necessarily evenly spaced, the x and y values may be changed around to make the final calculation slightly easier being a straight calculation.

Another an interpolation function suitable for use with the digitization and interpolation technique according to the present invention is a spline function (for which many variations exist, eg Natural, Beizier and B-splines) which is able to follow some trajectories more accurately because it can have a sharper curve. This feature often results in more accurate interpolation because the flatter polynomials are unable to pass through the measured points without an apparent over-correction for values between the measured points and the functional relationship is not expected to be as complicated as a higher order polynomial.

A B-spline curve may be represented in parametric space over the interval [0,1] for the points by $(p_i, p_{i+1})$ by a matrix equation of the following form:

$$B_i(u) = \frac{1}{6}[u^3, u^2, u, 1] \begin{bmatrix} -1 & 3 & -3 & 1 \\ 3 & -6 & 3 & 0 \\ -3 & 0 & 3 & 0 \\ 1 & 4 & 1 & 0 \end{bmatrix} \begin{bmatrix} p_{i-1} \\ p_i \\ p_{i+1} \\ p_{i+2} \end{bmatrix}$$

The matrix comprises entries that vary depending on the type of spline. The B-spline shown above is named after its shape, bell shaped for its endpoints that are flat. Some splines pass through every point, some splines have different conditions for the endpoints. The multiplier ⅙ may also change if the matrix is chosen differently.

It will be appreciated that the use of splines is computationally expensive in a low power application where the number of computations cost power. The cubic spline approximation needs subsequent iterative root finding which may outweigh the low power advantage gained by coarse sampling.

In the case of certain signal detection systems, the peak of the reflection, not the leading edge, indicates the moment at which a reflection occurs. This is especially true for pulse radar signals where correlation is used in the sample system that enables measurements to be made at much lower speeds-than the raw signal.

The peak may be poorly represented in a coarsely measured profile and the use of interpolation allows the correct trajectory to be recreated to a high degree of accuracy. If a polynomial has been fitted to the coarsely measured date set then its coefficients are known and the peak can be calculated by finding the roots of the derivative. For example, if a polynomial of degree 3 has been fitted to the data set (using least squares or by direct solution of 4 data points) using the following equations:

$$f(x)=a_3 x^3+a_2 x^2+a_1 x+a_0$$
$$f'(x)=3a_3 x^2+2a_2 x+a_1$$
$$=0$$

Then the roots are most readily solved using the following well-known equation:

$$\frac{-b \pm \sqrt{b^2 - 4ac}}{2a}$$

Where the coefficients a, b and c are given by $a=3a_3, b=2a_2, c=a_1$ It is likely that one of the roots will be irrelevant in which case it is discarded.

If a lower order curve is fitted to the coarsely measured points then an easier calculation will result. For a quadratic fit to the original data, the co-efficient $a_3$ will be set to 0 and the single root to the derivative will be at $$f'(x) = 2a_2 x + a_1$$
$$x = \qquad x = \frac{-a_1}{2a_2}$$

According to another aspect, the approximation between two measured points may be made by generating a curve between the points $((t_p, a_p), (t_{p+1}, a_{p+1}))$. Where two points are required for the straight line interpolation described above, three or more points are necessary to generate a curve. The curve is generated by first determining the coefficients of the higher order function. However, if the filtering step (block 201) in FIG. 5 is properly performed a second order function will suffice.

Advantageously, the digitization and interpolation method according to the present invention results in a higher resolution distance measurement for the pulse-echo acoustic ranging system 10 while utilizing an A/D converter with slower sample rate which provides a reduction in power consumption.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A time of flight ranging system comprising:
   (a) a transducer for emitting energy pulses and detecting reflected energy pulses;
   (b) a controller having a receiver component and a transmitter component, and said controller including an analog-to-digital converter and a precise timebase generator;
   (c) said transducer having an input port operatively coupled to said transmitter component and being responsive to said transmitter component for emitting said energy pulses, and said transducer including an output port operatively coupled to said receiver component for outputting reflected energy pulses coupled by said transducer;
   (d) said receiver component converting said reflected energy pulses into corresponding electrical signals, and said receiver component having an output port coupled to an input port on said analog-to-digital converter for receiving said electrical signals, said analog-to-digital converter being responsive to control signals from said controller for obtaining a plurality of amplitude measurement points at predetermined intervals derived from said precise timebase generator;
   (e) said controller including a program component for applying an interpolation function between adjacent amplitude measurement points, and said interpolation function providing an approximation of the reflected energy pulse shape between said adjacent amplitude measurement points in a form suitable for further processing by said controller.

2. The time of flight ranging system as claimed in claim 1, wherein said interpolation function comprises a linear interpolation function.

3. The time of flight ranging system as claimed in claim 2, wherein said receive component includes a low pass filtering circuit for filtering the received energy pulses.

4. The time of flight ranging system as claimed in claim 1, wherein said interpolation function comprises a second order polynomial function.

5. The time of flight ranging system as claimed in claim 4, wherein said receive component includes a low pass filtering circuit for filtering the received energy pulses.

6. The time of flight ranging system as claimed in claim 1, wherein said interpolation function comprises a least squares method.

7. The time of flight ranging system as claimed in claim 6, wherein said receive component includes a low pass filtering circuit for filtering the received energy pulses.

8. The time of flight ranging system as claimed in claim 1, wherein said interpolation function comprises a spline function.

9. The time of flight ranging system as claimed in claim 8, wherein said receive component includes a low pass filtering circuit for filtering the received energy pulses.

10. A pulse-echo acoustic ranging system comprising:
    (a) a transducer for emitting acoustic pulses and detecting reflected acoustic pulses;
    (b) a controller having a receiver component and a transmitter component, and said controller including an analog-to-digital converter and a precise timebase generator;
    (c) said transducer having an input port operatively coupled to said transmitter component and being responsive to said transmitter component for emitting said acoustic pulses, and said transducer including an output port operatively coupled to said receiver component for outputting reflected acoustic pulses coupled by said transducer;
    (d) said receiver component converting said reflected acoustic pulses into corresponding electrical signals, and said receiver component having an output port coupled to an input port on said analog-to-digital converter for receiving said electrical signals, said analog-to-digital converter being responsive to control signals from said controller for obtaining a plurality of amplitude measurement points at predetermined intervals derived from said precise timebase generator;
    (e) said controller including a program component for applying an interpolation function between adjacent amplitude measurement points, and said interpolation function providing an approximation of the reflected acoustic pulse shape between said adjacent amplitude measurement points.

11. The pulse-echo acoustic ranging system as claimed in claim 10, wherein said interpolation function comprises a linear interpolation function.

12. The pulse-echo acoustic ranging system as claimed in claim 11, wherein said receive component includes a low pass filtering circuit for filtering the received energy pulses.

* * * * *